G. CHRISTENSON.
PISTON PACKING EXPANDER.
APPLICATION FILED AUG. 21, 1916.
1,222,362.
Patented Apr. 10, 1917.
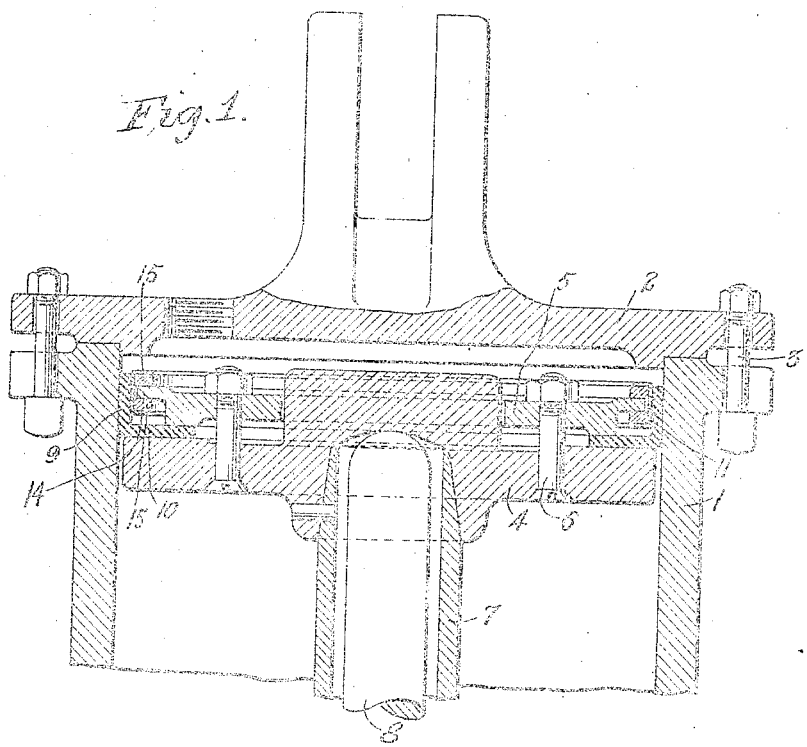
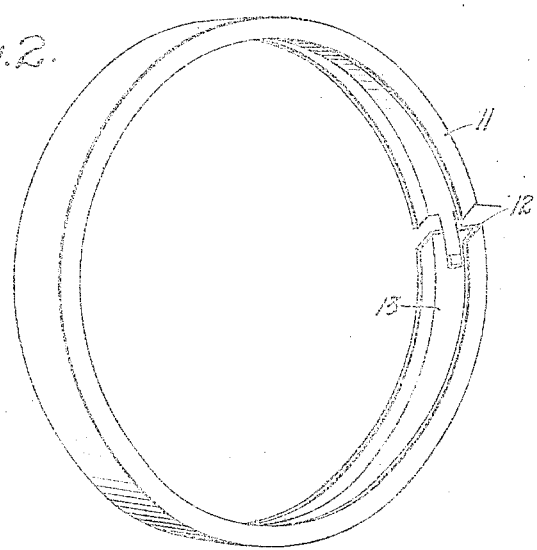
Inventor
George Christenson
By his Attorney

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PISTON-PACKING EXPANDER.

1,222,362.

Specification of Letters Patent.

Patented Apr. 10, 1917.

Application filed August 21, 1916. Serial No. 116,095.

*To all whom it may concern:*

Be it known that I, GEORGE CHRISTENSON, a citizen of the United States of America, residing at Jamaica, county of Queens, State of New York, have invented certain new and useful Improvements in Piston-Packing Expanders, of which the following is a specification.

My invention relates to devices for expanding flexible packing for pistons such as are used in air brake cylinders, and comprises certain improvements on, or modifications of, the structure shown in my U. S. Patent No. 862,540, dated Aug. 6, 1907. The best form of apparatus embodying my present invention now known to me is illustrated in the accompanying sheet of drawings in which—

Figure 1 is an axial section of an air brake cylinder and piston with my invention applied thereto, parts being broken away and Fig. 2 is a perspective view of the channeled split-ring expander.

Throughout the drawings like reference characters indicate like parts. 1, is a portion of the ordinary air brake cylinder having the head 2, fastened to it by bolts 3. 4, is a piston head, 5 the piston follower, and 6, one of the bolts which fasten the head and follower together to form the usual piston structure. 7, is the usual form of hollow piston rod used in freight brake equipment, set in the piston head 4, and 8, the usual push rod. The usual form of cup leather packing is shown in Fig. 1 formed of a strip of leather or other flexible material having the cylindrical outer portion 9, and the inwardly bent ring-shaped inner edge portion 10.

The foregoing parts are of usual construction except that the piston follower 5, is cut away more than usual so as to leave a circumferential tongue 14, projecting therefrom. 11, is a split-ring shown in perspective in Fig. 2, which is of channeled cross section with the concave or channel portion on the inside. Preferably the ends of this ring are tongued and grooved as shown at 12. to maintain the abutting ends in alinement. The concave or inner grooved side 13, of the ring 11, is of a cross section sufficient to encompass the two spring split-rings 15, 15, placed on either side of the piston follower tongue 14.

In operation, the spring split-rings 15, 15, tend to expand and to force the packing ring 11, which is preferably of softer, cheaper metal, against the inner portion of the cylindrical section 9, of the cup leather packing and hold it firmly against the walls of the cylinder. At the same time the tongue 14, on the piston structure serves as a guide and retainer for the composite packing ring expander formed by the parts 11, 15, 15.

The advantages of my invention over prior forms of piston packing expander comprise the broad area of outward pressure exerted on the inner surface of the packing leather resulting from the wide face of ring 11, the even character of that pressure resulting from the use of two spring split-rings 15, 15, one pressing along each edge of ring 11, and the location of the pressure surface solely against the cylindrical portion 9, of the cup leather and up to the extreme edge thereof. These features of operation of my present invention avoid the tendency of packing leathers to curl back at the edge, and to wear through at the junction of portions 9, and 10, as the result of the pressure of the expander being localized at that point in most previous structures. The use of two springs also gives flexibility and insures the automatic adjustment of the structure to any inequalities in the thickness of the packing leather.

Having described my invention, I claim:

1. The combination with the usual piston structure and band of flexible packing thereon of a split-ring, of channeled cross section having its concave side toward the center arranged within said packing and two spring split-rings mounted in the inner concave side of the channeled ring, the piston structure having a radially projecting guide extending between said spring rings.

2. The combination with the usual piston head, piston follower and cup leather packing having its inner edge clamped between the two, of a sheet metal split-ring of channeled cross section having its concave side toward the center arranged within the cylindrical portion of said packing and two spring-split-rings located within the first mentioned ring, said piston follower having a circumferential tongue of proper cross section to fit between the two spring-rings and said tongue and spring-rings filling the inner concave portion of the first mentioned ring when the parts are assembled.

GEORGE CHRISTENSON.